United States Patent [19]

Bastiolo et al.

[11] Patent Number: 5,334,634
[45] Date of Patent: Aug. 2, 1994

[54] POLYMER COMPOSITIONS FOR THE PRODUCTION OF ARTICLES OF BIODEGRADABLE PLASTICS MATERIAL AND METHODS FOR THEIR PREPARATION

[75] Inventors: Catia Bastiolo, Novara; Vittorio Bellotti, Fontaneto D'Agogna; Luciano Del Giudice, Milan; Roberto Lombi, Novara, all of Italy

[73] Assignee: Novamont S.p.A., Milan, Italy

[21] Appl. No.: 744,288

[22] Filed: Aug. 13, 1991

Related U.S. Application Data

[62] Division of Ser. No. 530,925, May 29, 1990, abandoned.

[30] Foreign Application Priority Data

May 30, 1989 [IT] Italy ................... 67413-A/89

[51] Int. Cl.$^5$ ............... C08L 89/06; C08L 101/00; C09H 9/02
[52] U.S. Cl. ................................. 524/47; 524/52
[58] Field of Search ........................ 524/47, 52

[56] References Cited

U.S. PATENT DOCUMENTS

| | | | |
|---|---|---|---|
| 3,652,542 | 3/1972 | Hiermstad | 524/47 |
| 4,673,438 | 6/1987 | Wittwer | 106/126 |
| 4,863,655 | 9/1989 | Lacourse et al. | 264/53 |
| 4,900,361 | 2/1990 | Sachetto et al. | 106/213 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |

FOREIGN PATENT DOCUMENTS

| | | |
|---|---|---|
| 0032802 | 7/1981 | European Pat. Off. . |
| 0282451 | 9/1988 | European Pat. Off. . |
| 0298920 | 1/1989 | European Pat. Off. . |
| 0326517 | 8/1989 | European Pat. Off. . |
| 0327505 | 8/1989 | European Pat. Off. . |
| 0304401 | 12/1989 | European Pat. Off. . |
| 0391853 | 10/1990 | European Pat. Off. . |
| 0404723 | 12/1990 | European Pat. Off. . |
| 0404727 | 12/1990 | European Pat. Off. . |
| 0404728 | 12/1990 | European Pat. Off. . |
| 0407350 | 1/1991 | European Pat. Off. . |
| 0408501 | 1/1991 | European Pat. Off. . |
| 0408502 | 1/1991 | European Pat. Off. . |
| 0408503 | 1/1991 | European Pat. Off. . |
| 0409781 | 1/1991 | European Pat. Off. . |
| 0409782 | 1/1991 | European Pat. Off. . |
| 0409783 | 1/1991 | European Pat. Off. . |
| 0409788 | 1/1991 | European Pat. Off. . |
| 0409789 | 1/1991 | European Pat. Off. . |
| WO91/02024 | 2/1991 | PCT Int'l Appl. . |
| WO91/02025 | 2/1991 | PCT Int'l Appl. . |
| 2190093 | 11/1987 | United Kingdom . |
| 8802313 | 2/1988 | United Kingdom . |

OTHER PUBLICATIONS

*Chemical Abstracts,* vol. 7, No. 8, p. 47, Abstract No. 60151n, F. H. Otey et al., "Starch-based blown films" (Aug. 24, 1987).

Otey, F. H. et al., Ind. Eng. Chem. Res. 26(8):1659–63 (1987), "Starch-Based Blown Films".

*Primary Examiner*—Nathan M. Nutter
*Attorney, Agent, or Firm*—Bryan Cave

[57] ABSTRACT

A polymer composition usable for the production of articles of biodegradable plastics material includes an ethylene/vinyl alcohol copolymer and destructured starch. Preferably, the composition is obtainable by mixing the ethylene/vinyl alcohol copolymer, in a heated extruder, with a starch component constituted by a destructured starch composition produced beforehand by mixing starch with a high-boiling plasticizer, such as glycerine and a destructuring agent, preferably constituted by urea, in an extruder. Alternatively, the composition can be obtained by mixing the ethylene/vinyl alcohol copolymer with starch and a plasticizer in an extruder, with water added as appropriate and possibly with a suitable destructuring agent.

The composition is particularly useful for the production of films with good resistance to perforation and tearing and molded articles with improved mechanical strength. The products made from this composition are also good oxygen and carbon dioxide barriers.

20 Claims, No Drawings

POLYMER COMPOSITIONS FOR THE PRODUCTION OF ARTICLES OF BIODEGRADABLE PLASTICS MATERIAL AND METHODS FOR THEIR PREPARATION

RELATED APPLICATIONS

This is a divisional application of U.S. patent application Ser. No. 07/530,925, filed May 29, 1990 and now abandoned.

The present invention relates to polymer compositions usable for the production of articles of biodegradable plastics material and to methods for their preparation.

In recent; years, many attempts have been made to provide new biodegradable polymers to replace conventional oil-based plastics materials which have a bad impact on the environment. Research has been carried out, on the one hand, to provide compositions which can be converted by conventional processes into films for packaging and mulch and, on the other hand, to provide compositions for the production of moulded articles with good mechanical strength.

As regards the production of compositions for films, U.S. Pat. No. 4,133,784 describes compositions constituted by starch and an ethylene-acrylic acid copolymer (EAA) which can be converted into films which are flexible, water-resistant, heat-weldable and biodegradable.

The compositions are converted into films by casting (spreading), simple extrusion or rolling (milling) techniques. However, these processes are slow and very expensive. Moreover, with certain starch contents, which are necessary to achieve the desired mechanical properties, the degree of biodegradability and the UV stability of the products are greatly compromised.

U.S. Pat. No. 4,337,181 proposes the addition to the EAA copolymer-starch composition of a quantity of a neutralizing agent, such as ammonia or an amine, sufficient, to neutralize some or all of the acid groups of the EAA, and then the blow-moulding of the formulation thus obtained with a moisture content of between 2 and 10%.

The addition of urea and/or polyols to the EAA copolymer/starch compositions in order to facilitate their preparation and improve the resulting films from the economic and qualitative points of view is also proposed in Ind. Eng. Chem. Res. 1987, 26, pages 1659-1663. The presence of the urea would have the effect of improving the gelling of the starch with small amounts of water and hence of enabling the direct production of a uniform film, from semi-dry compositions (a water content of around 16%) as well as of avoiding the need for the EAA copolymer-starch mixture to be mixed with large amounts of water in a mixer before the extrusion process.

In general, however, the films produced by the methods described in the technical documents mentioned above still have a low tearing resistance which makes then completely unsuitable for use for the production of packaging articles, such as bags and the like.

A first object of the present invention, therefore, is to provide compositions which can be converted into films by conventional filming techniques to produce a sheet material which, as well as being flexible, water-resistant, heat-weldable and biodegradable, has good mechanical strength characteristics and good resistance to tearing and perforation.

With reference to the production of moulded articles, this term meaning articles with wall thicknesses greater than 0.2 mm, U.S. Pat. No. 4,591,475 describes an injection moulding process starting with starch which has not been destructured.

In this case, the process has been found to be very variable since the viscosity of the product in the fused state is dependent on the rate of cutting deformation, which makes the moulding process greatly dependent on the speed of the screw, the temperature and pressure conditions and/or the water content, and reduces the quality of the articles produced.

Published European patent application No. EP-A-O 304401 describes a method for the injection moulding of capsules from destructured starch. In this case, the articles obtained by the process also have poor mechanical properties, as well as being very soluble in water.

In view of the above, a further object of the invention is to provide compositions useful for the production of moulded articles with good physical and mechanical properties.

In view of the specified objects, a first subject of the invention is a polymer composition usable for the production of articles of biodegradable plastics material, including an ethylene/vinyl alcohol copolymer and destructured starch.

The ethylene/vinyl alcohol copolymer, whose use in the composition according to the invention provides the desired mechanical, physical and chemical properties, has an ethylene content of from 10 to 40% by weight (15-50% mol), more preferably 30-45% mol, with a melt flow index (230° C., 2.16 Kg) of between 2 and 50, preferably between 6 and 20.

Further preferred features for the ethylene/vinyl alcohol copolymer are as follows:

| | |
|---|---|
| Intrinsic viscosity, [η] (in DMSO at 30° C. | 0.50–0.9 preferably 0.65–0.80 |
| Molecular weight distribution Mw/Mn (GPC in tetrahydrofurane) | 1.3–4 |
| Melting point temperature | <180° C. preferably 160–170° C. |
| Hydrolisys degree* | 90–99.9% |

*Basic hydrolisys and titration of the residual base with acid.

Copolymers produced by Solvay and available commercially under the trade name of Clarene registered trademark) may be used.

The term "starch", as used in the present description and in the claims, generally covers all the starches of natural or vegetable origin composed essentially of amylose and/or amylopectin. They can be extracted from various plants, such as, for example, potatoes, rice, tapioca, maize and cereals such as rye, oats and wheat. Maize starch is preferred. The term starch also covers modified starch whose acidity index has been lowered to a value of between 3 and 6, as well as potato starch in which the type and concentration of the cations associated with the phosphate group have been modified. Ethoxy derivatives of starch, starch acetates, cationic starches, oxidized starches, cross-linked starches and the like may be used in the method of the present invention.

The term destructured starch means a starch which has been heat-treated above the glass transition temperatures and melting points of its components, so that the components are subjected to endothermic transitions such as to produce a consequent disorder in the molecular structure of the starch granules. The methods for destructuring the starch and for preparing the composition according to the invention will be described more fully below.

In the composition according to the invention, destructured starch, and ethylene/vinyl alcohol copolymer may be present in a ratio by weight of from 1:19 to 19:1, preferably from 1:4 to 4:1.

The composition preferably includes a high-boiling plasticizer with, a boiling point above 150° C., which is present in a quantity of from 0.05 to 100% of the weight of the starch, preferably from 0.05 to 40% of the weight of the starch.

Polyols, such as polyethylene glycol with, a molecular weight of from 200 to 4000, ethylene glycol, propylene glycol, sorbitol and, preferably, glycerine, are used as plasticizers.

The composition may also include a quantity of urea of from 2 to 20% of the weight of the starch component. The use of urea is not necessary but it may be desirable as a starch-destructuring agent, depending on the method used for the preparation of the composition, as will be seen more fully below.

The composition may also include other low-melting polymers, in particular, modified ethylene polymers, specifically ethylene/acrylic acid (EAA) copolymers, or even polyvinyl alcohol, at a concentration of up to 15% of the weight of the total composition. With reference to the EAA copolymer, water-dispersible copolymers are used, such as those described in the U.S. Pat. No. 4,133,784 the contents of which are understood to be included in the present description as a result of its mention.

Cross-linking agents such as formaldehyde, paraformaldehyde, paraldehyde and epichlorohydrin may also be present.

It is intended that the composition may include other additives suitable for imparting specific properties to the articles which are to be produced from the composition. Thus, for example, UV stabilizers, for example, carbon black, may be added to improve the resistance of the articles to sunlight; flameproofing agents may be added if this property is required in the articles. Other additives include those conventionally incorporated in starch-based moulding or blow-extrusion compositions, such as fungicides, herbicides, antioxidants, fertilizers, opacifiers, stabilizers and plasticizers. All these additives may be used in conventional quantities as known to experts in the field or as easily determined by routine tests, and may constitute up to 20% by weight of the final composition.

The composition has a water content of no greater than 6% of the weight of the composition as a whole, resulting from the intrinsic moisture content o¢the starch used or from water added as appropriate during the preparation method.

The composition is prepared by mixing in a heated extruder to produce an extrusion which can be granulated for subsequent use in conventional plastics processing.

In its most usual form, the method for preparing the composition, which constitutes a further subject of the invention, comprises the step of mixing the ethylene/vinyl alcohol copolymer and starch in a ratio by weight of from 1:19 to 19:1 , preferably from 1:4 to 4:1, with a quantity of a high-boiling plasticizer of from 0.05 to t100% of the weight of the starch, possibly in the presence of a destructuring agent selected from the group consisting of urea, alkaline-earth or alkali metal hydroxides, in an extruder which is heated to a temperature and for a period of time sufficient to bring about the destructuring of the starch.

The composition may be prepared in a single mixing stage, in which case the destructuring agent is used in a quantity of from 2 to 20% of the weight of starch, and a quantity of water of from 0.05 to 00% of the weight of the starch is added as appropriate. Other useful destructuring agents may be constituted by sodium, potassium and calcium hydroxides. Ammonia may also be added in the extruder and the quantity used reduced to a content of no more than 0.5% of the weight of the composition by a drying stage during the extrusion process or thereafter.

The temperature within the extruder is between 120° and 170° C., preferably between 130° and 160° depending on the type of starch used and on its water content.

According to a preferred embodiment, the method for preparing the composition according to the invention comprises the step of mixing, in a heated extruder, the ethylene/vinyl alcohol copolymer with a destructured-starch-based component which is prepared beforehand by mixing starch in an extruder with a quantity of a high-boiling plasticizer of from 0.05 to 100% of the weight of the starch, in the presence of a quantity of a destructuring agent selected from the group consisting of urea, alkaline hydroxides, alkaline-earth hydroxides, and mixtures thereof effective for causing the destructuring of the starch at a temperature below the boiling point of the plasticizer and between 120° and 170° C., preferably, 130°–160° C.

The preparation of the destructured starch is carried out beforehand in the absence of added water, that is, in the presence only of the intrinsic water content of the starch as it is, which is generally between 10 and 13% by weight. During the preparation of the destructured starch component, low-melting copolymers, such as EAA in particular, may be added to the starch.

It has been found that the preparation of the destructured starch component beforehand in the presence of the high-boiling plasticizer and in the absence of added water produces a composition which can be processed at temperatures higher than 120° C. without problems due to the formation of bubbles and which can be extruded at low pressure without problems due to volatile substances. This composition is particularly suitable for subsequent mixing with the ethylene/vinyl alcohol copolymer component in the extruder.

The composition which is the subject of the invention is generally produced in the form of pellets for subsequent conversion into films or moulded products by techniques such as injection moulding, blowing, thermo-forming, etc.

The moulded products and films obtained with the use of the composition by means of conventional techniques for the processing of plastic materials fall within the scope of the invention in particular, with reference to the films or sheet materials, the composition enables films which have good mechanical strength characteristics, particularly cutting and perforation resistance, and which are useful as oxygen and carbon dioxide barrier films and for packaging or mulching to be produced by extrusion-blowing Further characteristics and advantages of the invention will become clear from the following examples, provided purely by way of illustration.

EXAMPLE 1

An ethylene/vinyl alcohol copolymer, Clarene R20 (registered trademark), and 15% of glycerine by weight of the copolymer were extruded at 140° C. by HAAKE Reomex extruder, model 252, with an L/D ratio of 19, a screw diameter of 19 mm, and a compression ratio of 1:3, and with the screw revolving at 40 rpm.

50 parts of the product thus obtained were mixed with 70 parts of GLOBE 0340 CERESTAR (registered trademark) starch, 50 parts of water and 15 parts of urea, and then extruded by the same extruder at 120° C. The extrusion thus obtained was converted into pellets.

The pellets were supplied to the same extruder with the use of a film-blowing head. Rectangular test pieces for tensile testing according to ASTM 882 were formed from the films approximately 100 microns thick.

The test pieces were conditioned at 23±1° C. and 55±5% relative humidity for 24 hours.

The mechanical strength tests gave the following results expressed as average values:

| | |
|---|---|
| Young's modulus | 5285 kg/cm$^2$ |
| yielding strain | 17% |
| yielding stress | 186 kg/cm$^2$ |
| breaking strain | 52.8% |
| breaking stress | 178 kg/cm$^2$ |

EXAMPLE 2 A composition was prepared containing:

63% by weight of undried GLOBE 03401 CERESTAR (trademark) starch with a water content of 11%;
25% by weight of glycerine;
7% by weight of urea;
5% by weight of the Dow Chemical copolymer EAA 5981 containing 20% of acrylic acid.

The components were supplied from a Licoarbo DC-10 batcher to a Baker Perkins MPC/V-30 extruder. The extruder was constituted by a two-screw unit divided into two regions, with a screw diameter of 30 mm and a screw length/diameter L/D) of 10:1, and connected to a single-screw extruder press with a capillary head and a screw having a diameter of 30 mm and an L/D ratio of 8:1, divided into three regions. The capillary nozzle used has a diameter of 4.5 mm.

The extrusion temperature was 140° C.

The extrusion obtained was pelletized without, problems.

60% of destructured starch pellets and 40% by weight of Clarene R20 ethylene/vinyl alcohol copolymer were extruded at 160° C. in the same extruder. The final blend was blown at 160° C. in a HAAKE extruder as described in Example 1.

The product obtained was characterized by a melting point of 135° C. and a glass transition temperature of 70° C.

The mechanical bending properties were measured on rectangular test pieces conditioned and prepared as described in Example 1, giving the following average values:

| | |
|---|---|
| Young's modulus | 3861 kg/cm$^2$ |
| yielding strain | 43% |
| yielding stress | 164 kg/cm$^2$ |
| breaking strain | 207% |
| breaking stress | 210 kg/cm$^2$ |

The tearing resistance determined on test pieces obtained according to the ASTM standard D1004 was 540 g/100 um. The perforation resistance and the breaking energy were 3.3 kg/μm and 0.13 Joules/100 μm respectively.

EXAMPLES 3-9

A composition was prepared containing:
39% by weight of undried GLOBE 03401 CERESTAR (trademark) starch of Example 2
37% by weight of an ethylene/vinyl alcohol copolymer having the properties shown in Table 1
12.8% by weight of glycerine
3.2% by weight of water
3% EAA 5981 copolymer (Dow Chemical)
5% urea.

The components were supplied from a gravimetric batcher to the Baker Perkins MPC/V-30 extruder used in Example 2. During tests 3-8 the extrusion processing temperatures were varied within the range 170°-140° in the two-screw zone of the extruder and within the range 170-140° in the single-screw zone.

The extrusion obtained was pelletized and extrusion-blown into a film as described in Example 1 at, about 160° C.

The tensile mechanical properties are shown in Table 2.

TABLE 1

Properties of the ethylene/vinyl alcohol polymers used in Examples 3-8.

| | EX. 3 | EX. 4 | EX. 5 | EX. 6 | EX. 7 | EX. 8 |
|---|---|---|---|---|---|---|
| Ethylene content (mol. %) | 42 | 38 | 38 | 38 | 44 | 44 |
| Intrinsic viscosity (DMSO, 30° C.) | 0.79 | 0.67 | 0.67 | 0.67 | 0.77 | 0.77 |
| Mw/Mn | 3.6 | 1.7 | 1.7 | 1.7 | 1.7 | 1.7 |
| Melting temperature (°C.) | 164 | 179 | 169 | 176 | 166 | 162 |
| Hydrolysis degree | 99.3 | 99.6 | 98.5 | 99.6 | 99.6 | 99.7 |
| Melt flow index (230° C., 2.16 kg) | 20 | — | — | — | — | — |
| Melt flow index (210° C., 2.16 kg) | — | 25 | 25 | 8 | 12 | 3 |

TABLE 2

Mechanical properties of the films obtained according to Examples 3-8

| TENSILE EXAMPLE PROPERTIES | EX. 3 | EX. 4 | EX. 5 | EX. 6 | EX. 7 | EX. 8 |
|---|---|---|---|---|---|---|
| $\tau_b$ (MPa) | 17.6 | 10.9 | 10.4 | 17.0 | 18.0 | 22.0 |
| $\epsilon_b$ (%) | 238 | 206 | 312 | 333 | 334 | 333 |
| E (MPa) | 149 | 88 | 64.5 | 109 | 110 | 285 |
| $e_b$ (KJ/m$^2$) | 1550 | 914 | 1462 | 1936 | 1966 | 2508 |

We claim:
1. A polymer composition usable for the production of articles of biodegradable plastics material, comprising an ethylene/vinyl alcohol copolymer and a destructured starch, wherein said ethylene/vinyl alcohol copolymer has an ethylene content of from 10 to 40% by weight and a melt flow index of from 2 to 50 and is present in a ratio to the destructured starch of from 1:19 to 19:1 by weight.

2. A polymer composition according to claim 1, in which the copolymer and the starch are present in a ratio of from 1:4 to 4:1 by weight.

3. A polymer composition according to claim 1, also including a high-boiling plasticizer at a concentration of from 0.05 to 100% of the weight of the starch component.

4. A polymer composition according to claim 3, in which the concentration of the high-boiling plasticizer is from 20% to 100% of the weight of the starch component.

5. A composition according to claim 3 or claim 4, in which the high-boiling plasticizer is selected form the group consisting of glycerine, polyethylene glycol, ethylene glycol, propylene glycol, sorbitol, and mixtures thereof.

6. A composition according to claim 1, also including a quantity of urea of from 2 to 20% of the weight of the starch component.

7. A composition according to claim 1, including water at a concentration of up to 6% of the total weight of the composition.

8. A composition according to claim 1, including a quantity of a polymer selected from modified ethylene copolymers and mixtures thereof, of up to 15% of the weight of the composition.

9. A composition according to claim 8, in which one of the modified ethylene copolymers is ethylene/acrylic acid.

10. A composition according to claim 1, including polyvinyl alcohol.

11. A composition according to claim 1, also including a quantity of ammonia of up to 0.5% of the weight of the composition.

12. A composition according to claim 1, wherein the ethylene/vinyl alcohol copolymer has an ethylene content of from 10 to 40% by weight and a melt flow index of from 6 to 20.

13. Articles in the form of films made from a polymer composition according to claim 1.

14. Moulded articles made from a polymer composition according to claim 1.

15. A method for the preparation of a polymer composition usable for the production of articles of biodegradable plastics material, comprising the step of mixing an ethylene/vinyl alcohol copolymer having an ethylene content of from 10 to 40% by weight and a melt flow index of from 2 to 50 and starch in a ratio by weight of from 1:19 to 19:1 with a high-boiling plasticizer in an amount of from 0.05 to 100% of the weight of the starch in an extruder which is heated to a temperature and for a period of time sufficient to bring about the destructuring of the starch.

16. A method according to claim 15, comprising the step of mixing, in an extruder heated to a temperature of between 120 and 170°, an ethylene/vinyl alcohol copolymer with a destructured-starch-based component which is prepared beforehand by mixing starch in an extruder with a quantity of a high-boiling plasticizer of from 0.05 to 100% of the weight of the starch, in the presence of a quantity of a destructuring agent selected from the group consisting of urea, alkaline or alkaline-earth hydroxides, and mixtures thereof effective for causing the destructuring of the starch at a temperature below the boiling point of the plasticizer and between 120 and 170° C.

17. A method according to claim 15, in which the high-boiling plasticizer is selected from the group consisting of glycerine, polyethylene glycol, ethylene glycol, propylene glycol, sorbitol, and mixtures thereof.

18. A method according to claim 15, in which the destructuring agent is added in a quantity of from 2 to 20% of the weight of the starch component, in which the mixing operation is carried out with the addition of a quantity of water of from 0.05 to 100% of the weight of the starch component, and in which the water concentration is reduced to a value no greater than 6% of the weight of the whole composition.

19. A method according to any one of claims 16 to 18, also including the addition of ammonia.

20. A method according to claim 15, wherein the mixing of the ethylene/vinyl alcohol copolymer, starch, and high-boiling plasticizer is in the presence of a destructuring agent selected from the group consisting of urea, alkaline-earth and alkali metal hydroxides.

* * * * *

UNITED STATES PATENT AND TRADEMARK OFFICE
CERTIFICATE OF CORRECTION

PATENT NO. : 5,334,634

DATED : August 2, 1994

INVENTOR(S) : Catia Bastioli et al.

It is certified that error appears in the above-indentified patent and that said Letters Patent is hereby corrected as shown below:

On the Title Page, item [75], change "Bastiolo" to --Bastioli--

Column 4, line 11 - "0.05 to 00% should read --0.05 to 100%--

Signed and Sealed this

Twenty-eight Day of February, 1995

Attest:

BRUCE LEHMAN

Attesting Officer     Commissioner of Patents and Trademarks